United States Patent
Burrus, IV et al.

(10) Patent No.: US 7,184,033 B2
(45) Date of Patent: Feb. 27, 2007

(54) FUEL GAUGE STYLUS

(75) Inventors: Philip H. Burrus, IV, Lilburn, GA (US); William Phelps, III, Lawrenceville, GA (US)

(73) Assignee: Motorola Inc., Schaumburg, IL (US)

( * ) Notice: Subject to any disclaimer, the term of this patent is extended or adjusted under 35 U.S.C. 154(b) by 345 days.

(21) Appl. No.: 10/230,029

(22) Filed: Aug. 28, 2002

(65) Prior Publication Data
US 2004/0041797 A1   Mar. 4, 2004

(51) Int. Cl.
G09G 5/00 (2006.01)

(52) U.S. Cl. .................... 345/179; 345/156; 345/183; 340/815.42; 356/425; 361/686; 385/88; 385/92

(58) Field of Classification Search .............. 345/156, 345/179, 183; 356/402, 403, 407, 425; 361/686; 178/18.11, 19.05; 340/815.42; 362/32; 385/54, 88, 901, 92
See application file for complete search history.

(56) References Cited

U.S. PATENT DOCUMENTS

| | | | |
|---|---|---|---|
| 4,481,717 A * | 11/1984 | Kowalski ..................... 33/265 |
| 4,697,926 A * | 10/1987 | Youngquist et al. ........ 356/478 |
| 4,845,684 A * | 7/1989 | Garwin et al. .............. 367/137 |
| 5,231,381 A | 7/1993 | Duwaer |
| 5,900,943 A * | 5/1999 | Owen .......................... 356/406 |
| D420,989 S | 2/2000 | Sandhu et al. |
| 6,046,733 A * | 4/2000 | Challener et al. ........... 345/179 |
| 6,095,673 A * | 8/2000 | Goto et al. .................. 362/582 |
| 6,154,200 A * | 11/2000 | Challener et al. ........... 345/180 |
| 6,246,577 B1 * | 6/2001 | Han et al. .................... 361/686 |
| 6,344,848 B1 | 2/2002 | Rowe et al. |
| 6,363,328 B1 * | 3/2002 | Nadeau ........................ 702/27 |
| 6,426,868 B1 * | 7/2002 | Fullerton ..................... 361/680 |
| 6,473,552 B1 * | 10/2002 | Fisher et al. ................. 385/133 |
| 6,621,697 B2 * | 9/2003 | O'Hara et al. ............... 361/686 |
| 2002/0097232 A1* | 7/2002 | Pogatetz et al. ............. 345/179 |
| 2002/0176225 A1* | 11/2002 | O'Hara et al. ............... 361/683 |

* cited by examiner

Primary Examiner—Bipin Shalwala
Assistant Examiner—Vincent E. Kovalick
(74) Attorney, Agent, or Firm—Hisashi D. Wantanabe

(57) ABSTRACT

This invention includes a stylus that employs a translucent material for conducting light to convey information from a portable electronic device to a user. In one preferred embodiment, the stylus provides a thermometer style fuel gauge. Inserting the stylus into a special stylus holder actuates the fuel gauge. A thermometer like fuel gauge reading then appears in the body of the stylus. Other embodiments include changing color, focal point of a lens and light intensity to convey information. The stylus may be used to convey any type of information, including receipt of e-mail by the portable electronic device.

13 Claims, 3 Drawing Sheets

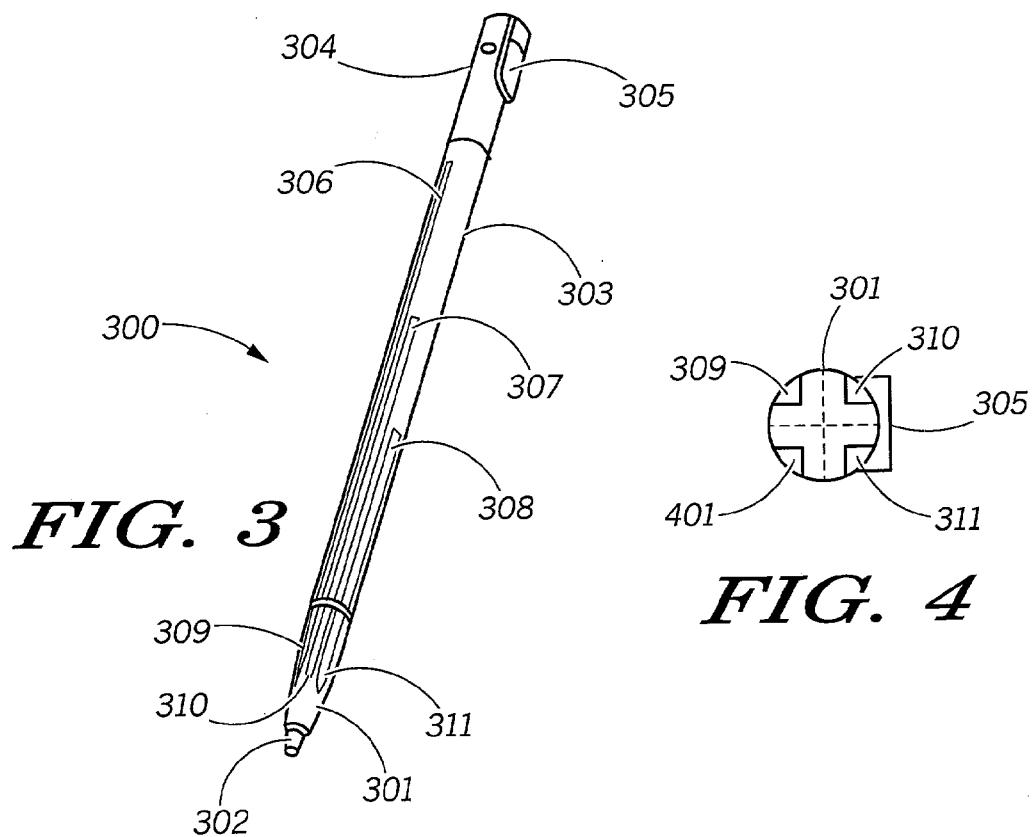
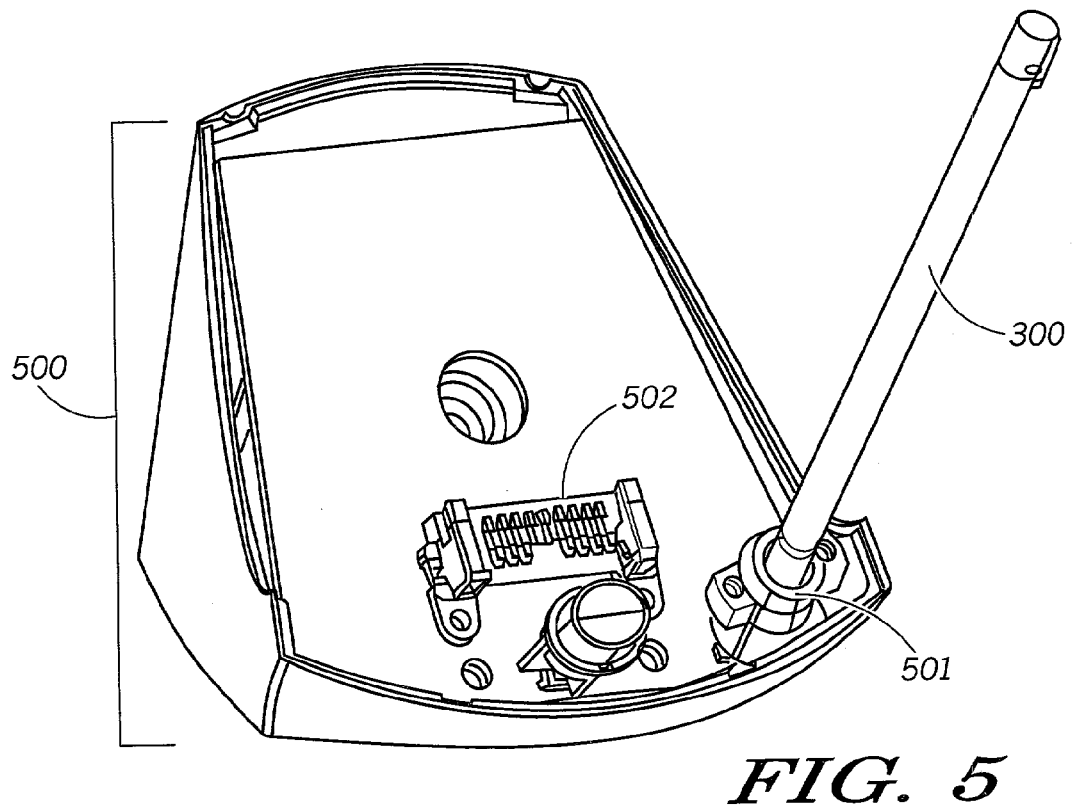

FUEL GAUGE STYLUS

BACKGROUND

1. Technical Field

This invention relates generally to portable computers with touch-sensitive screens and rechargeable batteries, and more particularly to a stylus assembly associated with such portable computers.

2. Background Art

Personal Digital Assistants (PDAs) are all the rage. It is nearly impossible to go to a business meeting and not see at least one person whip out a handheld, shirt-pocket sized computer and start tapping away at the screen. US Robotics introduced these devices in the mid-1990s. Today, Palm, Inc. is one of the most prolific suppliers of these devices, which are colloquially called "palm organizers". Other manufacturers of these devices include Sony and Handspring.

The typical method of using a PDA involves a touch sensitive screen and a pen-shaped object known as a "stylus". Referring now to FIG. 1, illustrated therein is a PDA 101 and a stylus 100. To enter data into the PDA 101, the user takes the stylus 100 and "writes", as if with a pen on paper, on the touch sensitive screen 102. The screen interprets the stylus strokes as alphanumeric characters and stores them in the computer's memory. Such a system is described in U.S. Pat. No. 5,231,281 to Duwaer.

Some PDAs use primary batteries, like AA sized alkaline batteries. Other PDAs use rechargeable batteries, like lithium-ion cells. The PDAs with rechargeable batteries include a cradle for charging. To charge the battery, the user places the PDA in the cradle. Electrical contacts in the cradle then meet with electrical contacts in the battery to charge the battery. Such a cradle is shown in FIG. 2.

Most PDAs include some form of fuel gauge. The fuel gauge tells the user how much battery capacity remains. These fuel gauges generally take the form of a picture of a battery on the screen, with a shaded region to indicate the remaining battery capacity. Referring now to FG. 6, fuel gauge indicator 600 is approximately three-fourths shaded, indicating about 75% battery capacity remaining.

A problem exists with this method of fuel gauge indication. This type of fuel gauge is only displayed on the screen when the PDA is turned on. Thus, if the PDA is charging in the cradle, the user does not know how much battery capacity remains without turning the PDA on. Powering the device adds a load to the charger that reduces charging efficiency.

Additionally, the fuel gauge typically is only displayed on the main menu screen. Consequently, if a user is working in his calendar, he must stop working and toggle over to the main screen to see the fuel gauge. Such interruptions in work waste time.

There is thus a need for an improved fuel gauging device.

BRIEF DESCRIPTION OF THE DRAWINGS

FIG. 3 illustrates a stylus in accordance with the invention.

FIG. 4 illustrates a cross sectional view of a stylus in accordance with the invention.

FIG. 5 illustrates a cradle having a stylus receptacle in accordance with the invention.

DETAILED DESCRIPTION OF THE INVENTION

Figure 1:
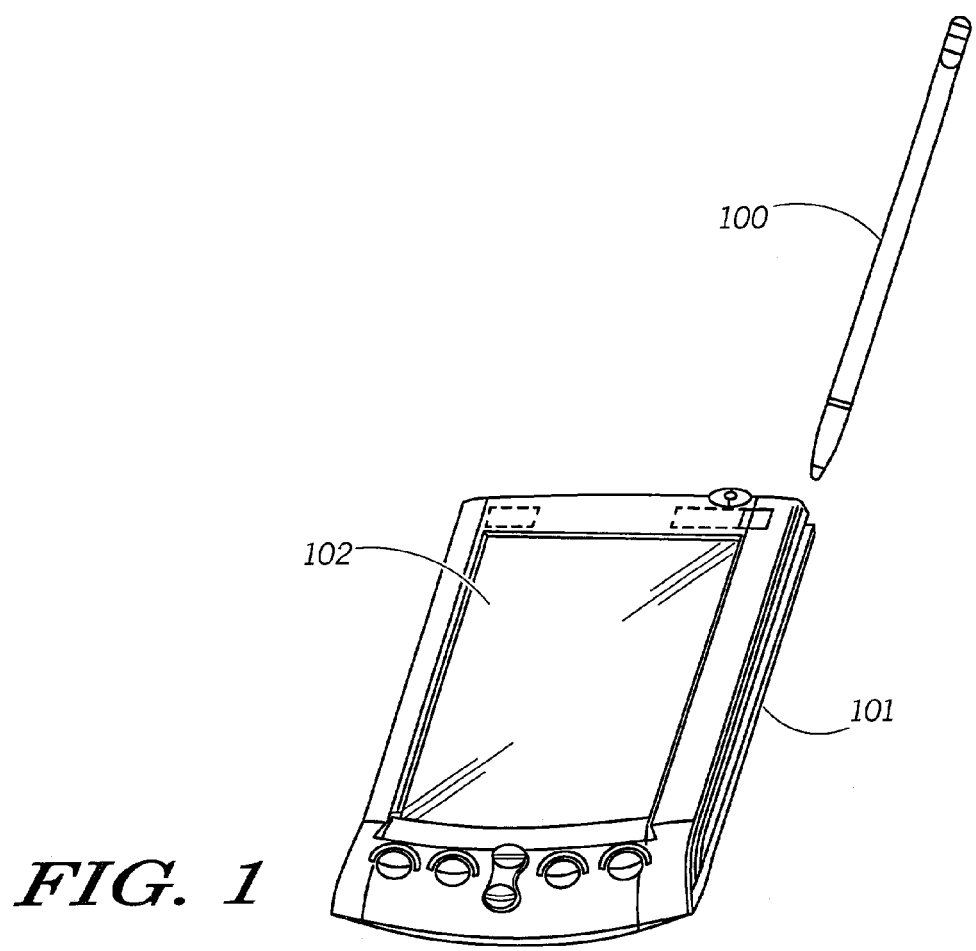
FIG. 1 illustrates a prior art portable computer and stylus.
Figure 2:
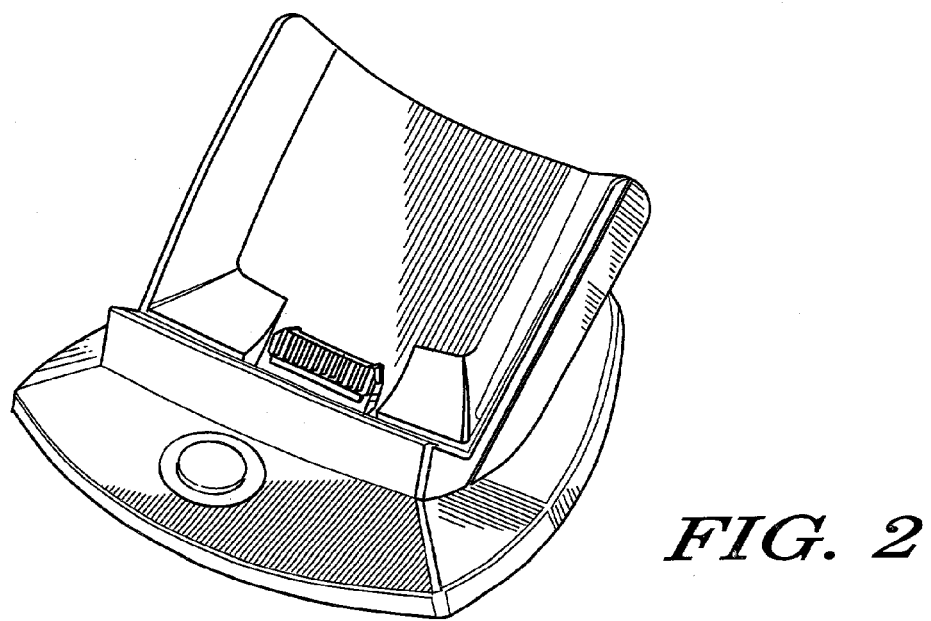
FIG. 2 illustrates a prior art cradle for a portable computer.
Figure 6:
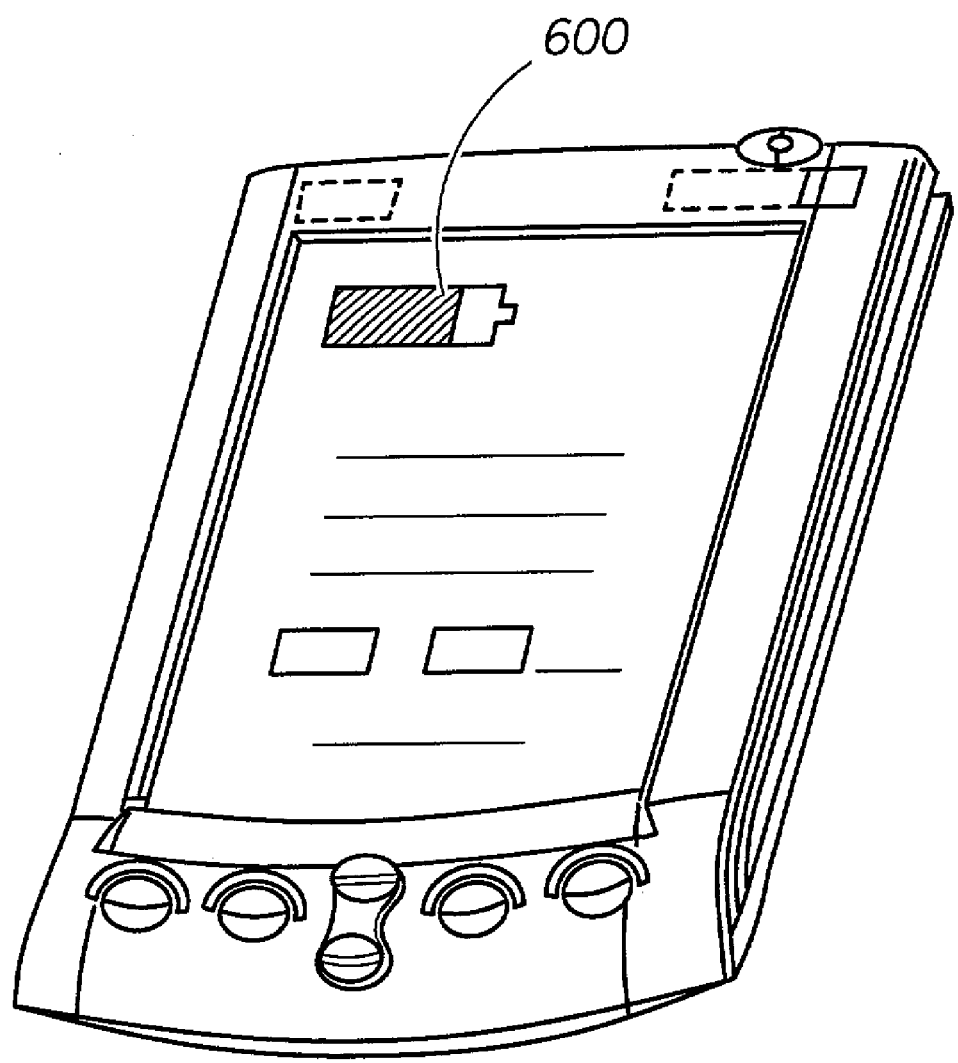
FIG. 6 illustrates a prior art fuel gauge.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Roughly stated, this invention provides a stylus assembly that provides a way to determine the remaining battery capacity in a handheld computer. Referring now to FIG. 3, illustrated therein is one preferred embodiment of a stylus 300 in accordance with the invention. The stylus 300 includes a writing end 301 having a tip 302 for making contact with the touch screen of a portable computer. The stylus has a body 303 through which the fuel gauging information is displayed. The stylus 300 includes a back end 304, which may include a finger grip 305 to assist in removing the stylus 300 from its carrying holder in a portable computer.

In one preferred embodiment, the body 303 of the stylus 300 includes light carrying optical fibers 306–308. Each fiber 306–308 is of a differing length and is connected to a corresponding window 309–311 on the writing end 301 of the stylus 300. For example, fiber 306 is coupled to window 309, fiber 307 is coupled to window 310, and so on.

When no light is being projected into the windows 309–311, the stylus body appears as a single, solid color. Illuminating a particular window, however, causes the corresponding fiber to illuminate. When the fiber length is correlated to battery capacity, a thermometer-like readout is available to the user. For example, in this illustrative embodiment, fiber 306 may correspond to full capacity, while fiber 307 corresponds to half capacity, and so on.

While any number of fibers may be included, one preferred embodiment includes four fibers. A cross section of such a stylus is shown in FIG. 4. The writing end 301 of the stylus is shown in cross section. The finger grip 305 may also be seen in this cross sectional view. The writing end 301 of the stylus has been divided into quadrants. A window is included in each quadrant. Window 309 corresponds to fiber 306 of FIG. 3 and represents full capacity. Window 310 corresponds to fiber 307 of FIG. 3 and represents half capacity. Window 311 corresponds to fiber 308 of FIG. 3 and represents one-quarter capacity. Window 401 corresponds to a fiber not shown in FIG. 3 and represents 75% capacity.

A special stylus receptacle provides the light needed to illuminate one of the windows, and thus one of the fibers. Such a stylus holder may be included in a cradle or in the portable computer itself. Referring now to FIG. 5, illustrated therein is a cradle 500 having such a stylus receptacle 501. For illustrative purposes, the exemplary stylus 300 from FIGS. 3 and 4 has been inserted into the stylus receptacle 501. The interior of the stylus receptacle 501 has been sectioned into quadrants that correspond to the stylus quadrants shown in FIG. 4. Each quadrant of the stylus receptacle 501 includes a light source, preferably a focused light emitting diode (LED). The stylus receptacle 501 is equipped with a push-button switch such that when the stylus 300 is inserted into the stylus holder 501 and depressed, the appropriate light is actuated.

Battery capacity information may be obtained from either the host device itself or from charging circuitry disposed in the cradle 500. For example, the portable computer may deliver battery capacity information through electrical contacts 502 in the cradle 500. This information is then conveyed to the user via the stylus 300. By way of example, if the battery is 75% full, the portable computer delivers this information to the cradle 500. The cradle 500 keeps the real-time capacity stored in a memory device. When the user inserts the stylus 300 into the stylus holder 501, the light corresponding to 75% is actuated by way of the push button switch. The appropriate window is illuminated, thereby causing the fiber that runs three-quarters of the way up the stylus is illuminated. The user sees a thermometer-like reading of about three quarters, and knows that the battery is 75% full.

Note that while a cradle is nice, the stylus holder may alternately be coupled to the computer itself. The stylus holder would operate in exactly the same manner, without the need of the cradle. The advantages of this embodiment include the fact that a cradle is no longer required to use the special stylus. Additionally, when user is working in a specific application, like the date book for example, the user simply checks the capacity with the stylus and holder without having to exit the date book program. The stylus receptacle may also be coupled to a rechargeable battery.

While the multiple light source-sectioned stylus and holder method works well, there are other preferred embodiments that work equally well. One such embodiment uses a shutter. Rather than having separate light sources for illumination of the windows, a single light source is provided with a rotatable shutter having an aperture equal in area to that of one of the windows. When the stylus holder is actuated, the shutter rotates to align the aperture with the appropriate window, thereby actuating the appropriate fiber. This embodiment reduces the number and alignment of light sources, as a general light source may be used. The shutter is easily tooled from injection-molded plastic and does the work of precision alignment of the light source.

An alternate embodiment involves using a single light-conducting stylus with either a single or no fibers. (In the no fiber embodiment, the plastic stylus body operates as a large, single fiber.) In this particular embodiment, the entire stylus is illuminated when the stylus is placed in the stylus holder. Battery capacity is communicated to the user preferably in one of two ways: color or intensity.

In the embodiment employing color, multiple light sources are again used. For example, a red and green LED may be used. When the battery is less than one-third full, the red LED may actuate upon depression of the push button switch. If the battery is between one third and two thirds full, both the red and green LEDs may light, thereby giving a yellow light. If the battery is more than two thirds full, the green LED may light. In this fashion, the user determines the battery capacity by the color of the stylus when inserted into the stylus holder.

In the embodiment employing light intensity, a single light source is used. The intensity of light is changed to reflect battery capacity. For example, if a LED is used as the light source, the luminous intensity may be altered by altering the current flowing in the LED. Thus, depending upon battery capacity, a plurality of current limiting resistors may be coupled to the LED. A multiplexing circuit then switches in the appropriate resistor for the particular battery capacity. A weakly lit stylus may indicate low battery status, while a brightly lit stylus may indicate full capacity.

Another alternative embodiment involves using a single light source with a lens to change the focal point of light within the stylus. In this embodiment, there is no line or bar of light projected. Instead, a moving star of light appears in the stylus. When the star is at the bottom of the stylus the battery is empty, whereas when the star is at the top, the battery is full. This is achieved by way of a lens and a changing focal point. The focal point of the light in the stylus forms the light star. By changing the focal length, the star moves up the stylus proportionally with battery capacity.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, illustrative embodiments of this invention have centered on battery capacity. The invention could be employed for other types of information as well. By way of example, for portable computers with wireless capabilities, the stylus may illuminate when a new e-mail has arrived. Additionally, alarm information, like calendar events and to do list items may cause actuation.

Additionally, the stylus is not limited to portable computers. It is applicable to any electronic device employing a stylus, including cellular phones and pagers.

What is claimed is:

1. A stylus for an electronic device, comprising:
   a body;
   a writing end coupled to the body;
   a plurality of fibers for conducting light disposed within the body;
   wherein at least one of the plurality of fibers for conducting light is actuated by inserting the stylus into a stylus receptacle; and
   wherein the writing end comprises a plurality of windows, each of the plurality of windows corresponding to each of the plurality of fibers for conducting light.

2. The stylus of claim 1, wherein the plurality of fibers for conducting light are selected from the group consisting of optic fibers and translucent plastic.

3. The stylus of claim 1, wherein the stylus receptacle comprises at least one light source, the at least one light source corresponding to the plurality of windows.

4. The stylus of claim 1, wherein the stylus receptacle comprises a rotatable shutter having an aperture, the aperture having an area equivalent to the at least one of the plurality of windows.

5. The stylus of claim 1, wherein the stylus receptacle comprises at least a first and at least a second light source, the at least a first light source having a color different than that of the at least a second light source.

6. The stylus of claim 1, wherein the stylus receptacle comprises a light source having variable intensity.

7. The stylus of claim 1, wherein the stylus receptacle comprises a lens having an adjustable focal length.

8. The stylus of claim 1, wherein the actuation of the plurality of fibers for conducting light corresponds to information stored within the electronic device.

9. The stylus of claim 8, wherein the information is selected from the group consisting of battery capacity information, alarm information and receipt notification of an electronic message.

10. The stylus of claim 1, wherein the stylus receptacle is coupled to an object selected from the group consisting of a cradle capable of coupling to the electronic device, the electronic device and a battery.

11. The stylus of claim 1, wherein each of the plurality of fibers for conducting light has associated therewith a length correlated to a battery capacity.

12. The stylus of claim 1, wherein the plurality of fibers for conducting light may indicate full capacity and half capacity.

13. A stylus for an electronic device, comprising:
a body;
a writing end coupled to the body;
a plurality of fibers for conducting light disposed within the body,
wherein at least two of the plurality of fibers for conducting light are of differing lengths.

* * * * *